United States Patent
Carlson et al.

(10) Patent No.: US 11,818,525 B2
(45) Date of Patent: Nov. 14, 2023

(54) WEARABLE HCI DEVICE

(71) Applicant: TECHONU, LIMITED, Middletown, DE (US)

(72) Inventors: Joshua Wesley Carlson, St. Augustine, FL (US); Bradley Shayne Ferringo, Winter Garden, FL (US)

(73) Assignee: TechOnU, Limited, Middletown, DE (US)

( * ) Notice: Subject to any disclaimer, the term of this patent is extended or adjusted under 35 U.S.C. 154(b) by 28 days.

(21) Appl. No.: 17/564,954

(22) Filed: Dec. 29, 2021

(65) Prior Publication Data

US 2022/0210531 A1    Jun. 30, 2022

Related U.S. Application Data (60) Provisional application No. 63/131,948, filed on Dec. 30, 2020.

(51) Int. Cl.
| | |
|---|---|
| *H04R 1/02* | (2006.01) |
| *G06F 3/01* | (2006.01) |
| *H04R 1/26* | (2006.01) |
| *H04R 3/12* | (2006.01) |
| *H04L 9/40* | (2022.01) |

(Continued)

(52) U.S. Cl.
CPC ............ *H04R 1/025* (2013.01); *G06F 3/017* (2013.01); *G06F 3/0346* (2013.01); *G06F 3/162* (2013.01); *H04L 9/0866* (2013.01); *H04L 63/0861* (2013.01); *H04R 1/26* (2013.01); *H04R 3/12* (2013.01); *H04L 2463/082* (2013.01); *H04R 2420/07* (2013.01); *H04R 2460/13* (2013.01); *H04W 88/04* (2013.01)

(58) Field of Classification Search
CPC . H04R 1/025; H04R 1/26; H04R 3/12; H04R 2420/07; H04R 2460/13; G06F 3/017; G06F 3/0346; G06F 3/162; H04L 9/0866; H04L 63/0861; H04L 2463/082; H04W 86/04
See application file for complete search history.

(56) References Cited

U.S. PATENT DOCUMENTS

| | | | |
|---|---|---|---|
| 9,231,282 B2 * | 1/2016 | Yebka | H02J 7/0013 |
| 10,999,667 B2 * | 5/2021 | Yang | H04R 1/1016 |

(Continued)

*Primary Examiner* — Andrew L Sniezek
(74) *Attorney, Agent, or Firm* — Forsgren Fisher McCalmont DeMarea Tysver LLP; James M. Urzedowski; Daniel A. Tysver (57) ABSTRACT

An audio generation device includes a housing adapted to be worn by a user, memory, and a processor configured to execute computer-executable instructions. The device includes at least two of the following: an adhesive located on an outer surface of the housing to removably couple the housing to the body of the user, a transducer coupled to receive an electrical signal from the processor, convert the electrical signal to an audio signal, and supply the audio signal to the body of the user, a six degrees of freedom (6DOF) sensor coupled to detect translation of the housing along three perpendicular axes, and rotation of the housing about the three perpendicular axes, a biometric sensor coupled to detect at least one biometric parameter of the body of the user, a rechargeable battery removably coupled with the housing, and a wireless interface to transmit data via a wireless network.

17 Claims, 3 Drawing Sheets

(51) Int. Cl.
*H04L 9/08* (2006.01)
*G06F 3/16* (2006.01)
*G06F 3/0346* (2013.01)
*H04W 88/04* (2009.01)

(56) References Cited

U.S. PATENT DOCUMENTS

| | | | |
|---|---|---|---|
| 11,525,703 B2* | 12/2022 | Chen | H03K 17/962 |
| 2015/0317855 A1* | 11/2015 | Sezan | G06F 21/35 |
| | | | 340/5.52 |
| 2017/0014572 A1* | 1/2017 | Newberry | A61M 5/14248 |
| 2019/0007765 A1* | 1/2019 | Pi | H04R 5/04 |
| 2019/0146583 A1* | 5/2019 | Seth | G06F 3/017 |
| | | | 345/156 |
| 2021/0015442 A1* | 1/2021 | Barnacka | A61B 5/6817 |
| 2021/0161100 A1* | 6/2021 | Devaney, II | A01K 15/02 |

* cited by examiner

WEARABLE HCI DEVICE

CROSS-REFERENCE TO RELATED APPLICATION

This application claims the benefit of U.S. Provisional Application No. 63/131,948, filed Dec. 30, 2020. The entire disclosure of the above application is incorporated herein by reference.

FIELD

The present disclosure relates to wearable audio generation devices.

BACKGROUND

This section provides background information related to the present disclosure which is not necessarily prior art.

Current wearable technology focuses on hardware that is separate from customers using the product, such as phones, watches, glasses, head visors, etc. that must be held, worn, or otherwise indirectly coupled for a temporary and limited human-computer interface (HCI). Biometrics, audio experiences, and other data provided by these external devices may be lost when the devices are removed. Some HCI devices are implanted, which may introduce medical procedures with significant risk, may compromise power capacity and duration of operation, may offer limited features and functionality, and may suffer from a limited upgrades ability without surgical intervention.

SUMMARY

This section provides a general summary of the disclosure, and is not a comprehensive disclosure of its full scope or all of its features, According to one aspect of the present disclosure, an audio generation device includes a housing adapted to be worn by a user, memory located in the housing to store computer-executable instructions, and a processor located in the housing and configured to execute the computer-executable instructions. The device includes at least two of the following: an adhesive located on an outer surface of the housing to removably couple the housing to the body of the user, a transducer coupled to receive an electrical signal from the processor, convert the electrical signal to an audio signal, and supply the audio signal to the body of the user, a six degrees of freedom (6DOF) sensor coupled to detect translation of the housing along three perpendicular axes, and rotation of the housing about the three perpendicular axes, a biometric sensor coupled to detect at least one biometric parameter of the body of the user, a rechargeable battery removably coupled with the housing to provide power to the processor, and a wireless interface in communication with the processor to transmit data via a wireless network.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
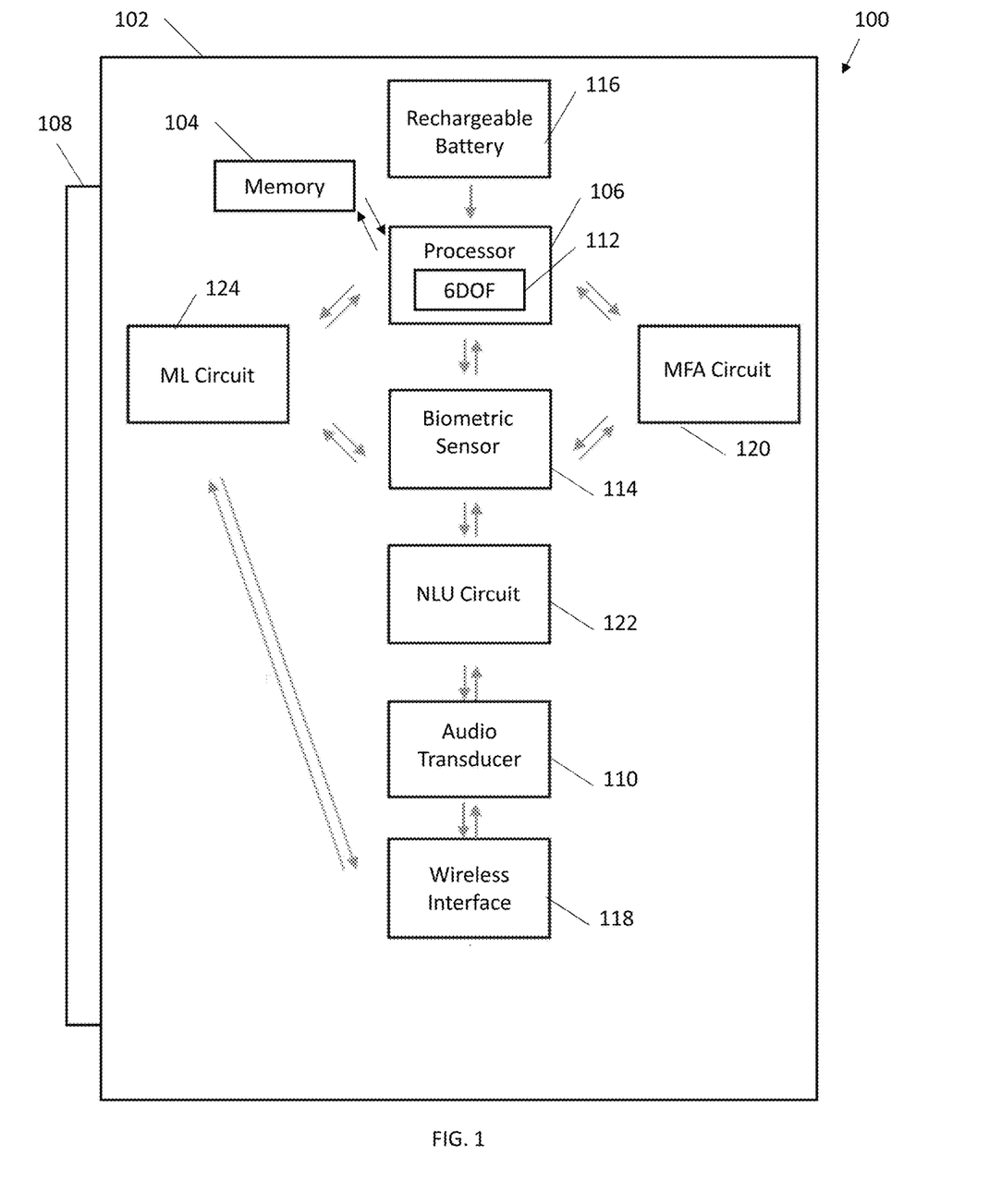
FIG. 1 is block diagram of an audio generation device, according to one example embodiment of the present disclosure.

An audio generation device according to one example embodiment of the present disclosure is illustrated in FIG. 1 and indicated generally by reference number 100. The device 100 includes a housing 102 adapted to be worn by a user. For example, the housing 102 may be worn on an ear of the user, adjacent an ear of the user, other suitable locations on the user's body, etc. The device 100 includes memory 104 located in the housing 102 to store computer-executable instructions, and a processor 106 located in the housing 102 and configured to execute the computer-executable instructions.

The device 100 further includes multiple optional components, which may be combined in any suitable arrangement. For example, an optional adhesive 108 may be located on an outer surface of the housing 102, to removably couple the housing 102 to the body of a user. The adhesive 108 may include a single adhesive unit, multiple adhesive units located at different positions on the housing 102, etc.

The device 100 may include a transducer 110 coupled to receive an electrical signal from the processor 106, convert the electrical signal to an audio signal, and supply the audio signal to the body of the user. The device 100 may include a six degrees of freedom (6DOF) sensor 112 coupled to detect translation of the housing along three perpendicular axes, and rotation of the housing about the three perpendicular axes. Although FIG. 1 illustrates the 6DOF sensor 112 as part of the processor 106, in other embodiments the 6DOF sensor 112 may be separate from the processor 106.

In some embodiments, the device 100 may include a biometric sensor 114 coupled to detect at least one biometric parameter of the body of the user, a rechargeable battery 116 removably coupled with the housing 102 to provide power to the processor 106, and/or a wireless interface 118 in communication with the processor 106 to transmit data via a wireless network. Although FIG. 1 illustrates one arrangement of connections between components, in other embodiments different components may be connected to one another, and communicate with one another, in any other suitable arrangement.

The device 100 optionally includes a multi-factor authentication (MFA) circuit 120 configured to authenticate the user, a natural language understanding (NLU) circuit 122 configured to convert audio or motion signals to natural language signals, and a machine learning (ML) circuit 124 configured to process various signals of the device 100. Although the MFA circuit 120, NLU circuit 122 and ML circuit 124 are illustrated in one arrangement in FIG. 1, in other embodiments these connected and located in the device 100 in any other suitable arrangement.

For example, the machine-learning processes may take place at a computing device remote from the device 100, where the device 100 transmits raw data to a cloud, a server, a blockchain, etc., for off-device processing, The outputs, results, etc. of the machine-learning processing may be sent back to the device 100 via the wireless interface 118.

In some embodiments, the multi-factor authentication may be generated remote from the device 100, by ending raw data to a server. The natural language processing may be performed off-device, with resulting text-to-speech (TTS) and audio waveforms sent back to the device 100 via the wireless interface 118.

As described above, the device 100 may include a wearable form factor that provides a number of advantages for users. For example, the adhesive 108 may be applied to the user's skin to create a directly coupled human computer interface (HCI) and self-contained system, which may be worn for days, weeks, or even longer. This form factor may provide significant improvements in utility and value, as the device 100 may not be subject to frequent removal like eyewear, visors, headsets, watches, etc. The device 100 may work independently without requiring input from the user, including during sleep. Therefore, a user wearing the device 100 may be continuously connected to a wireless network for monitoring, which provides an Internet-of-things (IoT) advantage over devices that require frequent user interaction and manual removal and putting back on again.

The transducer 110 may provide directly coupled audio to the user via multiple hardware components. For example, multiple transducers 110 may be used to provide a variety of audio delivery methods, including but not limited to bone conduction, audio conduction, cartilage conduction, and open-air speakers. The multiple transducers may be located forward of a user's ear, lateral to a user's ear, behind a user's ear, etc., in direct contact with the user's body, to provide private listening and true spatialization experiences.

For example, the device 100 may use direct contact audio devices that are located on the user's skin via an adhesive form factor. This may allow transmission of information to the user that is private, and may use smaller output signals (compared to non-direct contact audio devices) to save power. In some embodiments, one device 100 may be worn at a user's left or right ear. In other embodiments, two devices 100 may be used in a combined system. Placing one device 100 at each of the user's left and right ears may provide directional sonification and sonic information, including stereo imaging and surround sound for immersive experiences.

Using two devices 100 may allow for industry standard spatialized audio through head-related transfer function (HTRF) (e.g., for synthesized binaural audio experiences). Two devices 100 may offer true spatial audio through a combination of actuators, transducers, bone conduction, cartilage conduction, and open-air devices, which are physically positioned in front of the user's ear, above the user's ear, below the user's ear, lateral to the user's ear, and behind the user's ear (at both of the user's ears), for a total of ten positions. Therefore, sonic information may be delivered to provide an experience of true spatialization in a 360×360 degree format.

In some embodiments, devices 100 of different users may communicate with one another via clustered communication, using acoustic signatures. For example, an administrator platform may determine where multiple devices 100 are located based on acoustic signatures of the environment obtained by each device, by supplying an ultrasonic signal for echolocation, etc. This may allow the administrator platform to hear where each device 100 is located even in the dark, and even if a device 100 loses connectivity with a main network or WiFi access point. Communication may be maintained even while a device 100 is offline, to provide lossless situation awareness (LSA), which may be particularly advantageous in fields such as medicine, sports, and military applications.

Figure 2A:
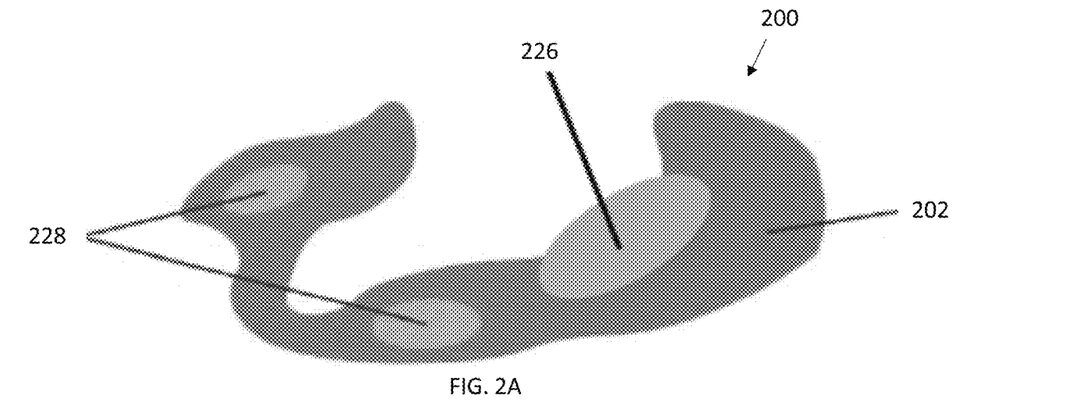
FIG. 2A is a side view of an example housing of an audio generation device, according to another example embodiment of the present disclosure.

FIG. 2A illustrates a side view of a device 200, which may be similar to the device 100 of FIG. 1. As shown in FIG. 2A, the device 200 includes a housing 202, which may include any suitable material such as elastic polyurethane. The device 200 is illustrated as being shaped for wearing at the user's left ear, although other embodiments may include any suitable housing shapes.

The device 200 includes a capacitive touch sensor 226, and two tap sensors 228. In other embodiments, the device 200 may include more or less sensors, sensors located at other positions on the housing 202, any suitable buttons or other components for receiving user input, etc.

Figure 2B:
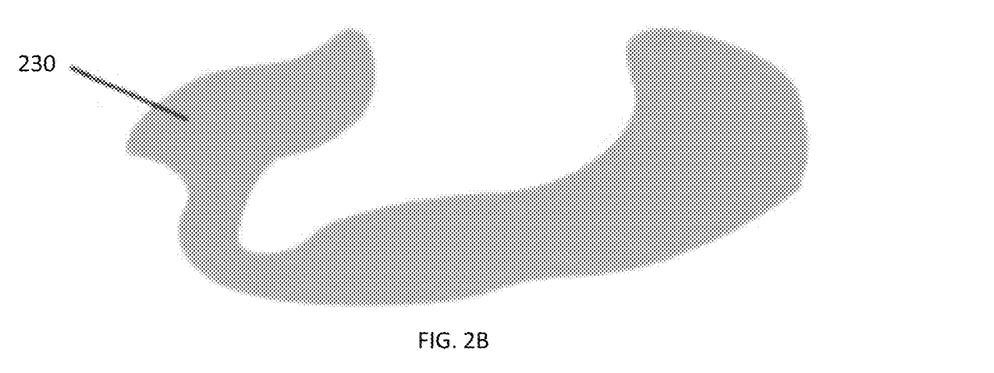
FIG. 2B is a side view of an example foam spacer located in the housing of FIG. 2A.

FIG. 2B illustrates an example foam spacer 230, which may be placed between an outer surface of the housing 202 and interior components of the device 200, such as a circuit board. The foam spacer 230 may be shaped similar to a profile of the housing 202, and may include any material suitable for inhibiting movement of components within the housing 202.

Figure 2C:
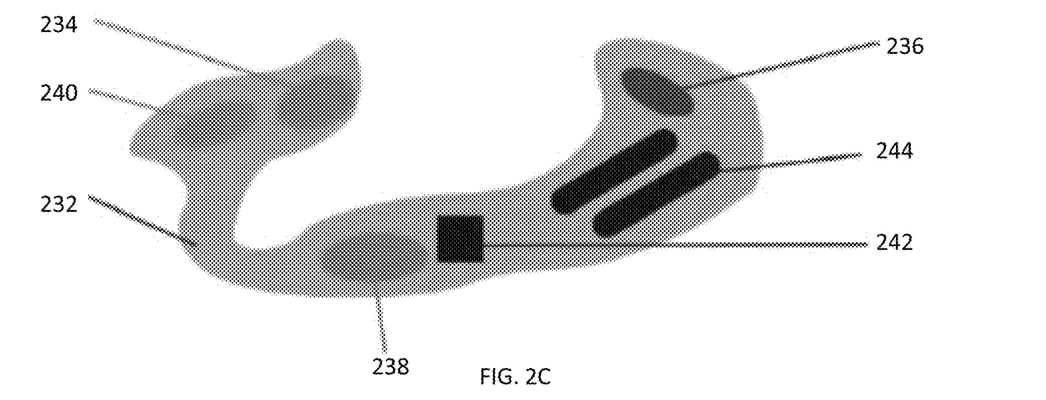
FIG. 2C is a side view of an example circuit board located in the housing of FIG. 2A.

FIG. 2C illustrates an example circuit board 232 that may be located within the housing 202 of the device 200. The circuit board 232 may include any suitable circuit board material, such as a polyimide substrate. As shown in FIG. 2C, the circuit board 232 includes a bone conduction microphone 234. The device 200 may effectively reduce ambient noise by use of the bone conduction microphone 234, providing more clarity and privacy to calls, voice-activated automated assistants (e.g., Siri), dictation, and other uses. In various implementations, one or more traditional (e.g., non-bone conduction) microphones may be included in the device 200, which may use a layout that matches positioning of speakers in the device 200.

The device 200 may use a bone conduction disc (e.g., a same piezoelectric element), to split audio channels and deliver bass, mid-range and treble signals separately to designated areas on the body for more sound control and clarity. For example, FIG. 2C illustrates a bone conduction transducer 236 for a bass frequency range, a bone conduction transducer 238 for a mid-range frequency range, and a bone conduction transducer 240 a for a treble frequency range.

Separating the frequencies across components at different locations on the device 200 may allow for one or more advantages, such as changing where the sound is perceptually coming from and going to, to provide a sense of spatializing audio via directionality and movement. For example, a static (e.g., mono, non-spatial file) that includes a sound of a train may be implemented with positional information for the user, such as bass content starting at the posterior (e.g., behind the ear) transducer 236, and then signals being sent to the mid-range transducer 238, and then the anterior (e.g., forward of the ear) transducer 240, to provide a sense of movement from a sound file that does not include dynamic content. This directionality may aid the user for safety, may provide navigational information, may be used to sonify any variable or parameter to provide sonic information to the user, etc. In various implementations, the same signal may be sent to all three transducers 236, 238 and 240.

The device 200 may provide a sonic-haptic experience, where a vibration signal is delivered to aural cartilage via a transducer, to produce a clearly audible sound. This may be referred to as cartilage conduction. The aural cartilage forms the outer ear, and is distributed around the exterior half of the external auditory canal.

In various implementations, the device 200 may be connected with a mobile device (e.g., a smartphone) to control parameters of the device (such as adjusting volume, bass, mid-range and treble, and left and right controls). Artificial intelligence (AI) driven experiences may provide robust experiences that are contextual to specific situations, use cases, enterprise deployments, or other professional applications of the technology.

Figure 2D:
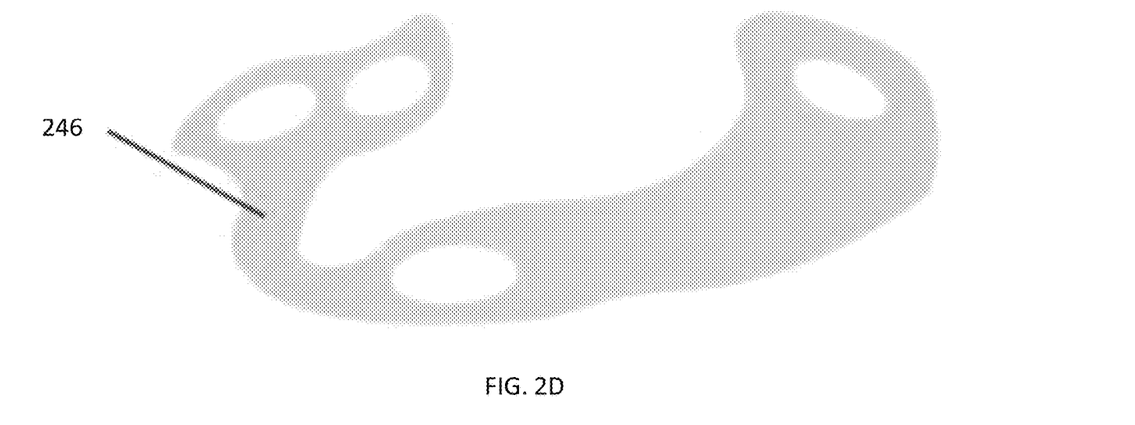
FIG. 2D is a side view of a transfer tape adhesive for use with the housing of FIG. 2A.
Figure 2E:
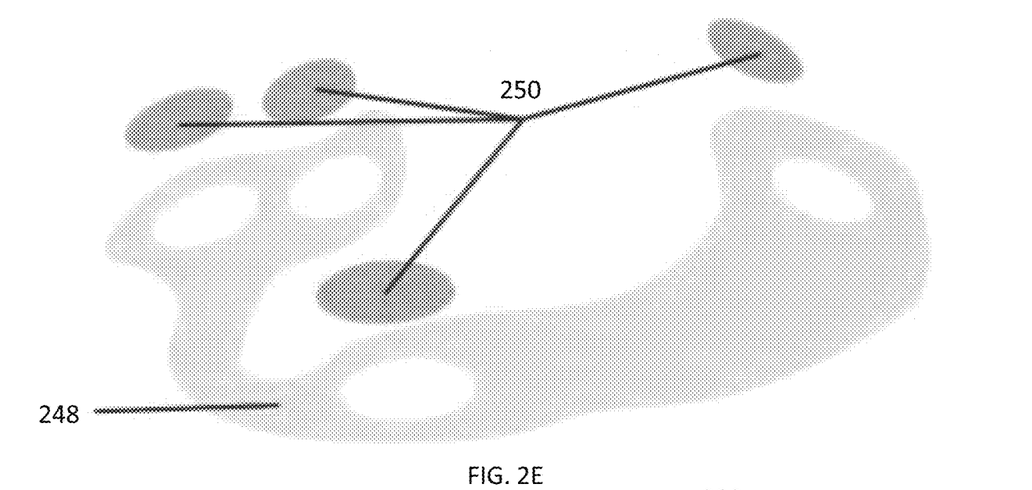
FIG. 2E is a side view of a protective liner for use with the housing of FIG. 2A.

As shown in FIG. 2C, the circuit board 232 includes rechargeable batteries 244, and a core processor 242. FIG. 2D illustrates an example transfer tape adhesive 246 that may be coupled with the housing 202, and FIG. 2E illustrates an example protective liner 248 that may be coupled with the housing. As shown in FIG. 2E, one or more conductive hydrogel pads 250 may be used for contacting the skin of the user.

Figure 3:
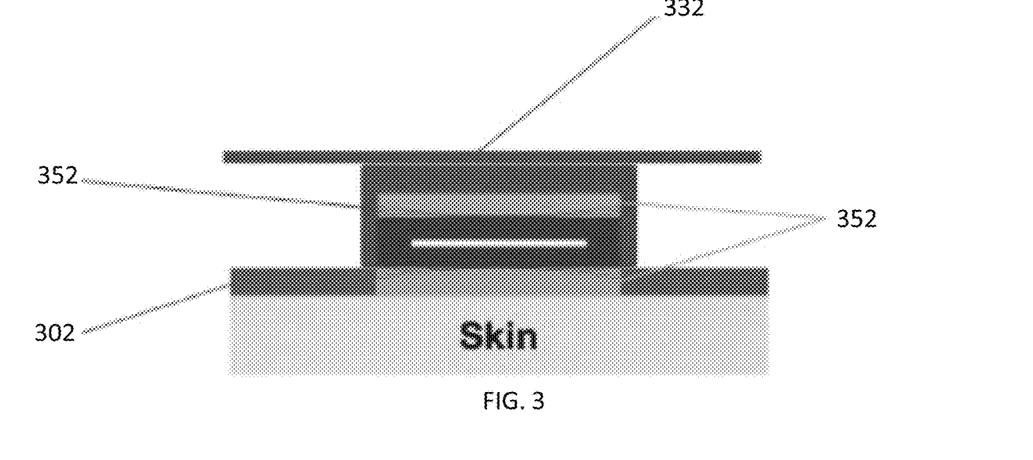
FIG. 3 is a sectional view of an example sound vibration channel in contact with a user's skin.

FIG. 3 is a sectional view of an example sound vibration channel 352 in contact with a user's skin. The sound vibration channel 352 is coupled to a flexible printed circuit board 332. The sound vibration channel 352 channels sound to the skin of the user.

A flexible material 354 is positioned between the sound vibration channel 352 and the user's skin, to allow the sound vibrations to be channeled and to achieve superior contact with the user's skin. The flexible material 354 may include hydro conductive gel pads. A die cut adhesive 302 is used to adhere the sound vibration channel 352 to the user's skin.

Referring back to FIG. 1, the 6DOF sensor 112 may provide situational and location-based awareness, which may facilitate continuous data generation, transmission and access. For example, 6DOF may refer to movement of a rigid body in a three-dimensional space, defined by translation of the body along three perpendicular axes often referred to as forward/backward (surge), up/down (heave), and left/right (sway), combined with changes in orientation through rotation about the three perpendicular axes, often termed yaw (normal axis), pitch (transverse axis), and roll (longitudinal axis).

The 6DOF sensor 112 may facilitate situational and contextual awareness and control for any suitable applications, such as fitness tracking, video gaming, and military engagement. The combination of the 6DOF sensor 112 and the adhesive form factor of the device 100 may provide advantages over devices that use other form factors or do not include a 6DOF sensor. In addition, combining the 6DOF sensor 112 with a wireless communication interface 118 and an AI system (e.g., where various sensors feed data into the AI system), may facilitate robust calculation and predictive technology.

For example, in a medical setting, combining the 6DOF sensor 112 with one or more biometric sensors 114, and AI algorithms, may provide clinicians with valuable information that is instant and actionable. It may be possible to calculate a likelihood of potential injury measured via a range of motion (such as whiplash), or a patient waking from a coma. A patient stirring from pain could get help more quickly, or a healthcare provider may intervene with a dementia patient that is attempting to get out of bed or leave a hospital.

In an athletic setting, the device 100 may provide coaches with actionable information on exertion, speed, range, and other performance metrics, to make better and more informed decisions on players and training. In a military setting, the device 200 may provide robust data on team position, gross motor and fine motor movements, and use AI to calculate inertia, risk, collision, etc.

If a suspected injury occurs (such as a car crash or sport impact), first responders, a coach, etc. can preview and isolate the last few moments in a three dimensionally rendered scrubbable map of the timeline of events. An AI algorithm may reconstruct positional data to present movements (including collisions) in fine detail to show the coach, health professionals, etc. what happened (e.g., an animated recreation of a sports injury from a collision that resulted in neck hyperextension). The AI algorithm may predict a likelihood of whiplash, concussion, etc., with a confidence rating, to assist professionals in making more informed decisions.

In various implementations, additional optional adhesives may be used on fingers, ankles, the lower back, etc., to provide more complete 6DOF information and more robust data, in order for the AI algorithm to make more accurate predictions.

The MFA circuit 120 may provide real-time continuous and robust multi-factor authentication, including the ability to generate vigorous and on-demand key encryption. Encryption keys are a crucial part of a robust information security system, and are typically static. This means that once authentication is performed, there is a long period where others may use the device without the system realizing that the current user is not the initial credentialed user.

The device 100 may include robust encryption generation that may be static and/or dynamic and continuous, by using sensors, movements, telemetry data, biometrics, other data, etc., to obtain a continuous stream of data to generate secure encryption keys that offer ongoing confirmation of the user over tune. This may provide advantages in many suitable applications, such as financial and medical scenarios, where interactions with doctors, bankers, retailers, etc. are seamless, and there is no need for the device 200 to interrupt the process with additional authentication requests.

When the device 100 is removed, secure communication is severed, and further use of the device 100 may require re-authentication. In various implementations, the device 100 may quickly (e.g., instantly) recognize biometrics and other data of a previous wearer of the device 100, such as unique data from electrocardiogram (ECG) signals, electroencephalogram (EEG) signals, bioimpedence (BIA) signals, etc.

Any suitable biometric sensor(s) 114 may be used for continuous data transfer and monitoring. Although FIG. 1 illustrates biometric sensor(s) 114, other embodiments may include any other suitable type of sensors for gathering data about a user or the user's environment.

For example, the device 100 may be capable of generating continuous data streams from various biometric sensors 114, along with signals from the 6DOF sensor 112 and telemetry data over long periods of time, including wireless biometrics during sleep or transportation. The data may be securely associated with a patient's accounts and charts using the MFA circuit 120, and used by an AI system to monitor for any trending patterns or potential issues that may be sent to healthcare professionals (such as a nurse station, a doctor's mobile device, etc.).

The biometric sensor(s) 114 may include, but are not limited to, temperature sensors, hydration sensors, pulse sensors, heart rate sensors, heart rate variability sensors, respiration rate sensors, $O_2$ saturation sensors, EEG sensors, ECG sensors, BIA sensors, sleep cycle sensors, blood sugar sensors, VHR sensors, conductivity sensors, hydration sensors, accelerometers, barometric pressure sensors, humidity sensors, ambient RF and EMF sensors, ambient and local lumen/light level sensors, ambient and local sound pressure level sensors, etc.

In sports scenarios, coaches may monitor an athlete's trending data (such as hydration, heart rate, etc.) via a graphical user interface (GUI) dashboard sent to their desktop computer, tablet computer, mobile device, etc., using a companion application. The device 200 may be part of a system that includes one or more adhesive pads at other locations on the user's body, which connect wirelessly to the device 200 or other main unit to provide higher resolution data for more accuracy and actionable data.

The rechargeable battery 116 may be removable from the housing 102 for replacement and continued operation of the device 100 without having to wait for battery recharge periods. In some embodiments, the battery 116 may be charged with one or more charging circuits located in the housing 102, such as an induction current charging circuit, a photovoltaic solar charging circuit, a thermal charging circuit, etc.

For example, each device 100 may include an internal rechargeable battery, and/or a secure receptacle for removable (e.g., hot-swappable) rechargeable batteries for long-term use without the need to remove the device 100 for charging. The device may use wireless charging (e.g. from a pillow using induction current) to recharge the device while the user sleeps, without the need to remove the device or change out the battery. In various implementations, solar collectors may be integrated into the outer fabric of each adhesive 108, to offer photovoltaic recharge. The device may use other suitable recharge methods, such as physical movement of the user, radiation heat from the user's body, and ionic discharge from sweat.

The wireless interface 118 may communicate wirelessly with another device, a network access point, etc., according to any suitable wireless communication protocol (such as a WiFi wireless network communication protocol like IEEE 802.11, a Bluetooth short-range wireless communication protocol, a cellular communication protocol like 5G, etc.).

In various implementations, the wireless interface 118 may include one or more communication protocols that allow multiple devices 100 to communicate with one another as a collective group (as opposed to each device 100 operating individually only with its own smartphone). For example, if a team of firefighters is in a burning building, one of the firefighters may get lost deep inside the building and experience a complete loss of network signal, cutting the firefighter off from critical communication and the ability to call for help or get out. If other firefighters are nearby with various levels of network signal connectivity, the devices 100 may communicate with one another and combine processing into one cluster (e.g., on demand in the background), which can relay duplex functionality to the lost firefighter so that nearby devices 100 provide network access to the device 100 of the lost firefighter.

As another option, the devices 100 may communicate with one another using sound (including but not limited to ultrasonic and microwave frequencies), and/or light (such as a laser frequency), and to offer external network access to devices 100 that are out of range. By combining wireless, sound, and/or light as carrier frequencies, the device 100 may provide advantages in maintaining device-to-device communication, and improving performance of the device 100 in the absence of network signals.

The NLU circuit 122 may be configured to offer voice-assistant functionality, and to understand speech and spoken phrases including colloquial terms. In various implementations, the NLU circuit 122 may combine its processing with other components, including the 6DOF sensor 112, the biometric sensor(s) 114, the audio transducer(s) 110, and the ML circuit 124. For example, the device 100 may register a user's head movement (such as a nod) according to signals from the 6DOF sensor 112, understand the context and meaning of the movement via the ML circuit 124, and convert the gesture to an audible 'yes' that can be heard by a third party (e.g., a military unit), without the user having to speak out loud, thereby providing a silent and/or gestural communication.

As described herein, the example devices may include a microprocessor, microcontroller, integrated circuit, digital signal processor, etc., which may include memory. The devices may be configured to perform (e.g., operable to perform, etc.) any of the example processes described herein using any suitable hardware and/or software implementation. For example, the devices may execute computer-executable instructions stored in a memory, may include one or more logic gates, control circuitry, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An audio generation device, comprising:
a housing adapted to be worn by a user;
memory located in the housing to store computer-executable instructions;
a processor located in the housing and configured to execute the computer-executable instructions;
a six degrees of freedom (6DOF) sensor coupled to detect translation of the housing along three perpendicular axes, and rotation of the housing about the three perpendicular axes;
a natural language processing circuit coupled to receive a motion signal detected by the 6DOF sensor, determine a gesture associated with the motion signal, and generate an audio signal corresponding to the gesture for transmission to another device; and at least two of:
an adhesive located on an outer surface of the housing to removably couple the housing to the body of the user;
a transducer coupled to receive an electrical signal from the processor, convert the electrical signal to an audio signal, and supply the audio signal to the body of the user;
a biometric sensor coupled to detect at least one biometric parameter of the body of the user;
a rechargeable battery removably coupled with the housing to provide power to the processor; and
a wireless interface in communication with the processor to transmit data via a wireless network.

2. The device of the claim 1, wherein the device includes at least three of the adhesive, the transducer, the 6DOF sensor, the biometric sensor, the battery, and the wireless interface.

3. The device of claim 1, wherein the device includes at least four of the adhesive, the transducer, the 6DOF sensor, the biometric sensor, the battery, and the wireless interface.

4. The device of claim 1, wherein the device includes at least five of the adhesive, the transducer, the 6DOF sensor, the biometric sensor, the battery, and the wireless interface.

5. The device of claim 1, wherein the device includes all six of the adhesive, the transducer, the 6DOF sensor, the biometric sensor, the battery, and the wireless interface.

6. The device of claim 1, wherein the device includes the biometric sensor, and the at least one biometric parameter includes at least one of a temperature, a hydration level value, a pulse, a variable heart rate variability, a respiration rate, an O2 saturation, an electroencephalogram (EEG) signal, an electrocardiogram (ECG) signal, a bioimpedance analysis (BIA) signal, one or more sleep cycle values, and a blood sugar value.

7. The device of claim 1, further comprising a charging circuit coupled with the rechargeable battery to supply power to the rechargeable battery, wherein the charging circuit includes at least one of:
an induction current circuit;
a photovoltaic charging circuit;
a thermal radiation charging circuit;
an ionic discharge charging circuit; and
a motion charging circuit.

8. The device of claim 1, wherein the processor is configured to authenticate the user via a multi-factor authentication (MFA) protocol, wherein the MFA protocol includes at least one biometric parameter of the user detected via the biometric sensor.

9. The device of claim 8, wherein the MFA protocol includes a dynamic encryption key corresponding to the detected at least one biometric parameter of the user.

10. The device of claim 1, wherein the device includes the wireless interface, and the wireless interface is configured to transmit data via at least one of a WiFi wireless network communication protocol, a Bluetooth short-range wireless communication protocol, and a cellular wireless communication protocol.

11. The device of claim 10, wherein the device includes the wireless interface, and the wireless interface is configured to communicate wirelessly with another device and with a network access point, to relay a signal from the other device to the network access point.

12. The device of claim 1, further comprising at least one of:
a sound communication interface configured to communicate wirelessly with another device via a specified sound frequency range; and
a light communication interface configured to communicate wirelessly with another device via a specified light frequency range.

13. The device of claim 12, wherein the device includes the sound communication interface and the specified sound frequency range includes at least one of an ultrasonic frequency range and a microwave frequency range.

14. The device of claim 12, wherein the device includes the light communication interface and the specified light frequency range includes a laser frequency range.

15. The device of claim 1, wherein the transducer includes at least one of a bone conductor transducer, a cartilage conduction transducer, and an open-air speaker.

16. The device of claim 15, wherein the transducer is a first transducer
   adapted to supply a first audio signal in a bass frequency range, and the device further comprises:
      a second transducer coupled to supply a second audio signal to the body of the user in a mid-range audio signal range; and
      a third transducer coupled to supply a third audio signal to the body of the user in a treble audio signal range.

17. The device of claim 1, further comprising at least one capacitive touch sensor located on the housing to receive a touch input from the user.

\* \* \* \* \*